United States Patent
Carson et al.

(10) Patent No.: US 8,089,852 B2
(45) Date of Patent: Jan. 3, 2012

(54) STORAGE MEDIUM WITH SEPARATE IMAGE AND DATA TRACKS

(75) Inventors: Douglas M. Carson, Cushing, OK (US); Anthony Paul Shore, Stillwater, OK (US)

(73) Assignee: Doug Carson & Associates, Inc., Cushing, OK (US)

( * ) Notice: Subject to any disclaimer, the term of this patent is extended or adjusted under 35 U.S.C. 154(b) by 1146 days.

(21) Appl. No.: 11/523,205

(22) Filed: Sep. 19, 2006

(65) Prior Publication Data

US 2007/0064545 A1    Mar. 22, 2007

Related U.S. Application Data

(60) Provisional application No. 60/719,065, filed on Sep. 21, 2005.

(51) Int. Cl.
*G11B 13/00* (2006.01)
(52) U.S. Cl. ............... 369/275.4; 369/14; 369/275.3
(58) Field of Classification Search ........... 369/275.3, 369/275.1, 275.2, 275.4, 273
See application file for complete search history.

(56) References Cited

U.S. PATENT DOCUMENTS

| | | | |
|---|---|---|---|
| 4,967,286 A | 10/1990 | Nomula et al. | |
| 5,504,688 A | 4/1996 | Letourneau | |
| 5,608,718 A | 3/1997 | Schiewe | |
| 5,729,533 A | 3/1998 | Marquardt | |
| 5,751,671 A | 5/1998 | Koike et al. | |
| 5,751,690 A | 5/1998 | Ohira et al. | |
| 6,015,939 A | 1/2000 | Yamamoto et al. | |
| 6,264,295 B1 | 7/2001 | Bradshaw et al. | |
| 6,490,239 B1 | 12/2002 | Nagasaka | |
| 6,556,234 B1 | 4/2003 | Koyama | |
| 6,754,158 B1 | 6/2004 | Kobayashi et al. | |
| 7,082,094 B2 | 7/2006 | Morishima et al. | |
| 2001/0024411 A1 | 9/2001 | Pirot et al. | |

(Continued)

FOREIGN PATENT DOCUMENTS

EP    1041563 A1    4/2000

(Continued)

OTHER PUBLICATIONS

Extended Search Report dated Apr. 1, 2011 from the European Patent Office for EP Application No. 06803847.0 (from PCT/US2006036449)—EP application corresponding to subject US application.

(Continued)

*Primary Examiner* — Will J Klimowicz
*Assistant Examiner* — Andrew Sasinowski
(74) *Attorney, Agent, or Firm* — Fellers, Snider, et al.

(57) ABSTRACT

A data storage medium such as an optical disc with separate image and data tracks, and a method and apparatus for forming the same. The medium has a user data storage area with a data track to store user data, and a non-user data image track to store human readable information to form a watermark interspersed with the user data. Preferably, the data track forms a portion of a first spiral and the image track forms a portion of a distinct second spiral nested within the first spiral. Alternatively, the data and image tracks are nested concentric circles. An increased track pitch is preferably provided for the data tracks in the data storage area adjacent the watermark to accommodate the intervening image tracks, and a reduced track pitch between data tracks is provided elsewhere. The medium can be pre-recorded or recordable.

18 Claims, 4 Drawing Sheets

U.S. PATENT DOCUMENTS

| | | | |
|---|---|---|---|
| 2001/0026531 A1 | 10/2001 | Onodera et al. | |
| 2003/0001943 A1 | 1/2003 | Hirotsune et al. | |
| 2003/0185128 A1* | 10/2003 | Shoji et al. | 369/59.25 |
| 2003/0185142 A1* | 10/2003 | Ohbi et al. | 369/275.3 |
| 2004/0165523 A1* | 8/2004 | Shimofuku | 369/275.4 |
| 2005/0147010 A1* | 7/2005 | Spruit | 369/53.35 |

FOREIGN PATENT DOCUMENTS

| | | |
|---|---|---|
| EP | 1079381 A2 | 2/2001 |
| EP | 1143723 A2 | 10/2001 |
| JP | 07-272325 | 10/1995 |
| JP | 08167170 | 6/1996 |
| JP | 11-219544 | 8/1999 |
| JP | 2003051118 | 2/2003 |
| JP | 2003523038 | 7/2003 |
| WO | 9600446 A1 | 1/1996 |
| WO | 9841983 A1 | 9/1998 |

OTHER PUBLICATIONS

Office Action from the Japanese Patent Office dated May 6, 2011 for JP Application No. 2008-532316 (from PCT/US2006036449)—JP application corresponding to subject US application.

* cited by examiner

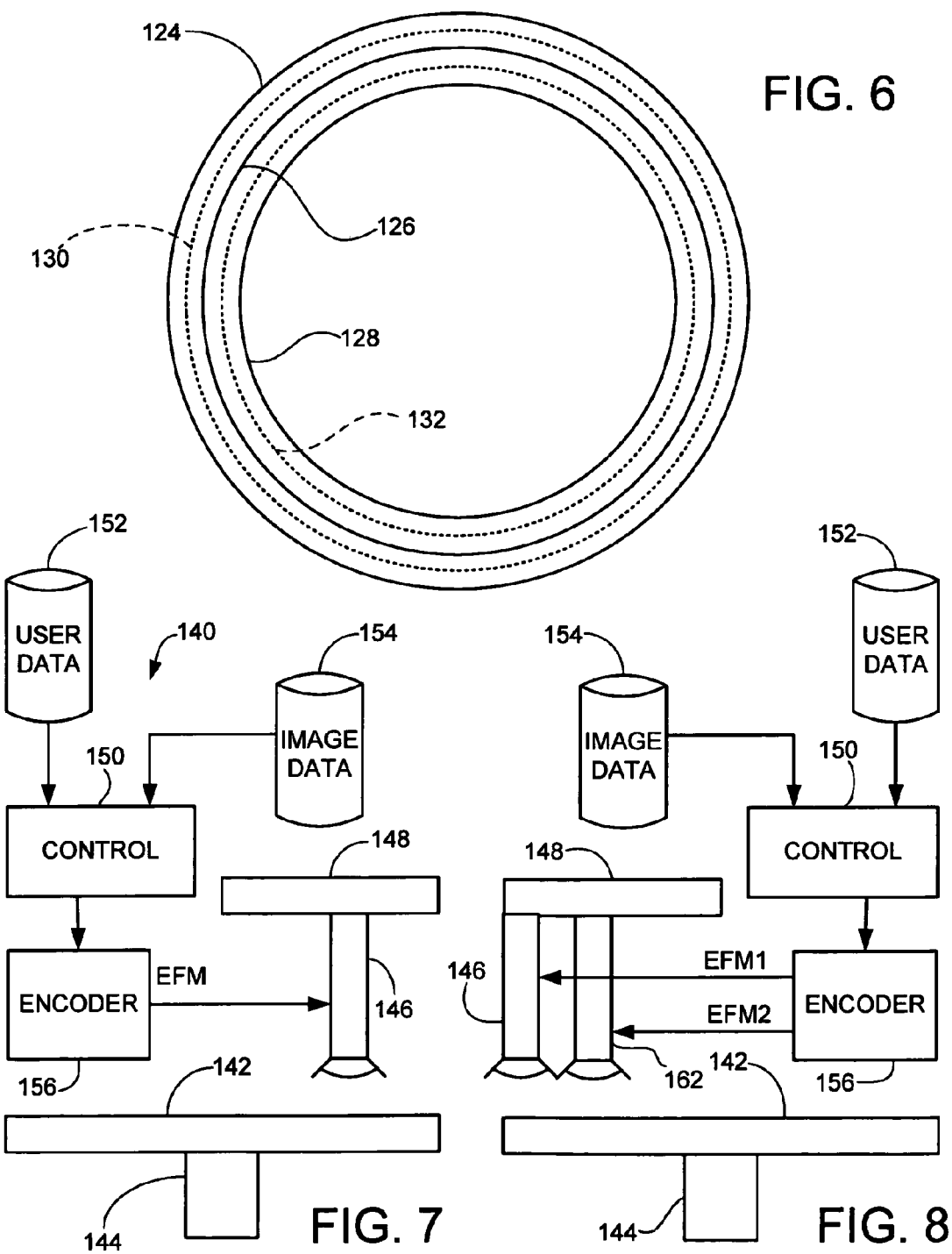

STORAGE MEDIUM WITH SEPARATE IMAGE AND DATA TRACKS

RELATED APPLICATIONS

The present application makes a claim of domestic priority to U.S. Provisional Patent Application No. 60/719,065 filed Sep. 21, 2005.

FIELD OF THE INVENTION

The present invention relates generally to the field of digital data storage and more particularly, but without limitation, to a data storage medium with separate image and data tracks, and a method for forming the same.

BACKGROUND

Digital data storage media often store data in an encoded format such that the data can be recovered from the media via a transducer and recovery signal processing electronics.

A particularly useful type of storage medium is an optical disc, which is generally portable in nature and can store any number of different types of data such as video, audio, computer ROM, etc. Optical discs are often commercially offered in accordance with industry proposed standards, such as DVD, DVD-HD, Blu-Ray, Mini-Disc, CD, CD-ROM, etc. Optical discs can further be pre-recorded or recordable (once or many times), and can have single or multiple data storage layers.

Generally, pre-recorded optical discs are formed using an injection molding or similar "pressing" operation whereby a series of pits and lands are formed along a number of tracks (one continuous spiral, a number of discrete concentric rings, etc.). The elevational difference between the pits and lands is selected to provide different effective reflectivities therebetween, allowing the transducer to detect each pit/land transition and form the readback signal therefrom.

Recordable optical discs are often configured such that localized areas on the disc undergo a spectral transformation during recording to provide areas of different reflective characteristics that function in a manner similar to the pits and lands in a recorded disc.

It is sometimes desirable to provide human readable information on a portion of an optical disc or other medium. This human readable information, sometimes referred to as a "watermark," can include graphics, title or content information, processing information, machine readable information (OCR, barcodes, etc.), and so on.

There have been a number of techniques proposed in the art to provide such information on a medium. Nevertheless, with the continued consumer demand for digital content from storage media (particularly optical discs), there remains a continual need for improvements in the manner in which such information can be provided. It is to these and other improvements that the present invention is generally directed.

SUMMARY OF THE INVENTION

Preferred embodiments of the present invention are generally directed to a data storage medium with separate image and data tracks, and a method and apparatus for forming the same.

In accordance with preferred embodiments, the medium is provided with a user data storage area comprising a data track to store user data, and a non-user data image track to store human readable information. The human readable information forms a portion of a human readable watermark interspersed with the user data.

Preferably, the data track forms a portion of a first spiral and the image track forms a portion of a distinct, second spiral nested within the first spiral. Alternatively, the data and image tracks are formed as nested concentric circles on the medium.

An increased track pitch is preferably provided for the data tracks in the data storage area adjacent the watermark to accommodate the intervening image tracks, and a reduced track pitch between data tracks is provided elsewhere within the data storage area not adjacent to the watermark. The medium is preferably characterized as a pre-recorded or recordable optical disc. The optical disc can be a single layer or multi-layer disc, and the image data can extend across multiple layers.

These and various other features and advantages, which characterize the present invention, will be apparent from a reading of the following detailed description and a review of the associated drawings.

BRIEF DESCRIPTION OF DRAWINGS

FIG. 6 provides an alternative arrangement for the data tracks and image tracks of FIG. 4 as a series of nested concentric rings.

FIG. 7 shows a mastering system configured to format a data storage medium in accordance with preferred embodiments of the present invention.

FIG. 8 shows another mastering system configured to format a data storage medium in accordance with preferred embodiments of the present invention.

DETAILED DESCRIPTION

Figure 1:
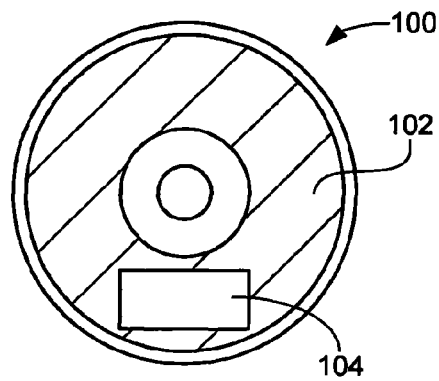
FIG. 1 shows a top plan representation of an exemplary data storage medium with a human readable watermark interspersed with a user data storage area, the watermark expressed in Cartesian coordinates.

FIG. 1 provides a top plan representation of an exemplary data storage medium 100, preferably characterized as a DVD compatible pre-recorded optical disc. The disc 100 is contemplated as having been formed during a mastering/replication process whereby a population of nominally identical discs are formed and packaged for authorized distribution through normal commercial channels, although such is not limiting.

The disc 100 has a data storage area 102 in which user data (content) are stored along a number of tracks. Human readable information (e.g., a "watermark") is depicted at 104 to provide a human readable pattern. This information is distinct from, and interspersed with, the user data in a manner explained below. The watermark in FIG. 1 is contemplated as being laid out in a substantially Cartesian (x-y) pattern.

Figure 2:
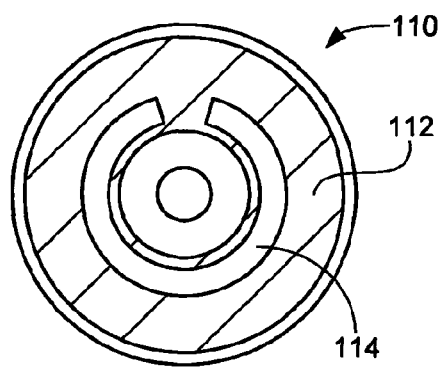
FIG. 2 provides a top plan representation of another exemplary data storage medium similar to that in FIG. 1, with an interspersed watermark expressed in polar coordinates.

A second exemplary medium 110 is depicted in FIG. 2. The medium 110 is preferably characterized as a DVD compatible recordable optical disc. As before, a data storage area 112 stores user data along a number of tracks, and human readable information (watermark) 114 is distinct from and interspersed with the user data. In this case, however, the watermark 114 wraps substantially around the disc 110 and is preferably laid out using polar coordinates. It will be understood that the watermarks 104, 114 are merely illustrative and not exhaustive as to the types, radial locations, and angular/radial extents of watermarks that can be formed in accordance with preferred embodiments.

The watermarks 104, 114 are formed on separate non-data tracks between the data tracks of the data storage areas. This is preferably accomplished by increasing the normal track-to-track separation (track pitch) of the data tracks to provide sufficient area therebetween to accommodate the image data.

Figure 3:
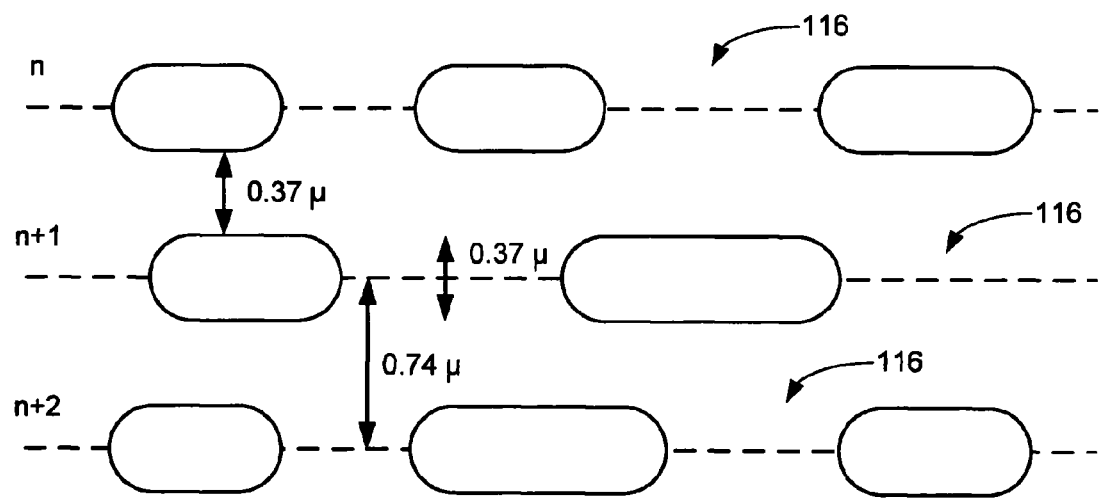
FIG. 3 sets forth a number of successively adjacent data tracks at a first track pitch between immediately adjacent pairs of said tracks.

FIG. 3 shows a simplified representation of a conventional DVD recording area. A number of data tracks 116, identified as tracks n, n+1 and n+2, store user data as a succession of marks (pits and lands) of selected variable length and different reflectivity characteristics. Each of the tracks preferably comprises a full 360 degree circuit around the disc, either as a part of a continuous spiral or as discrete concentric rings.

As shown in FIG. 3, the exemplary DVD track spacing has a track pitch of about 0.74 microns, $\mu$ ($0.74\times10^{-6}$ meters), which is the distance from the centerline of one track (shown in broken line fashion) to the centerline of the next adjacent track. The width of the recorded pits of each track 116 is about one-half the track pitch, or about 0.37 microns. The intervening space between the pits on adjacent tracks is also about one-half the track pitch, or about 0.37 microns. These various dimensions can vary, but are generally selected to facilitate stable servo tracking capabilities and to minimize cross-talk and interference.

Figure 4:
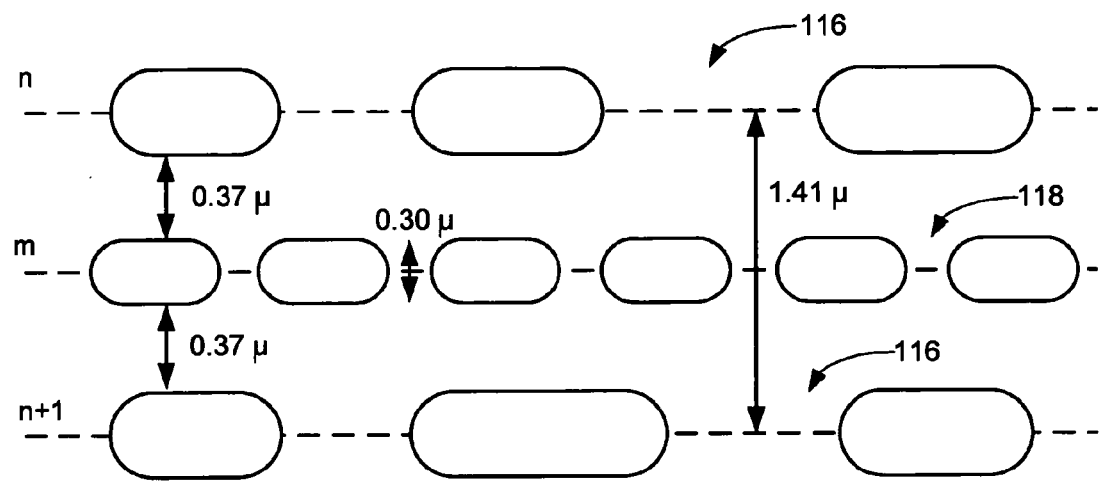
FIG. 4 sets forth a number of data tracks at a second track pitch greater than the first track pitch to accommodate one or more intervening image tracks between immediately adjacent pairs of said tracks.

FIG. 4 shows a selected pair of the tracks 116 of FIG. 3 with an increased track pitch to accommodate an intervening image track 118 (track m). As with the data tracks 116, the image tracks 118 each preferably represent a full 360 degrees around the medium, either as part of a continuous spiral or as discrete concentric rings. The image track 118 is represented as a uniform series of "dashed" marks, but this is merely for convenience in distinguishing the image track 118 from the data tracks 116. It will be appreciated that any number and types of intermittently occurring marks can be supplied along the image tracks 118 to form the desired watermark image.

As shown by FIG. 4, the width of the data tracks 116 is maintained at about 0.37 microns as before, but the track pitch (distance between centerlines of adjacent tracks 116) has been increased to about 1.41 microns. The image tracks 118 are each provided with a corresponding width of about 0.30 microns, leaving an intra-track spacing of about 0.37 microns as before. Other dimensions could readily be used as desired, however.

Figure 5:
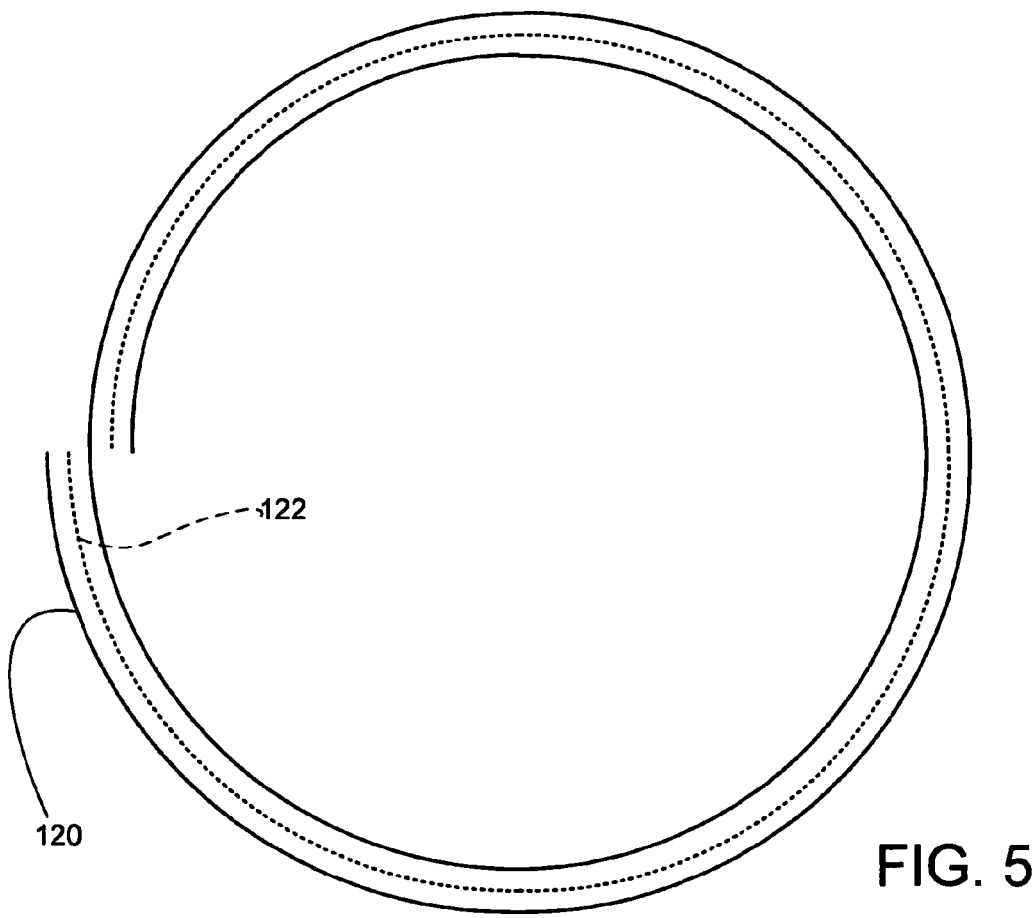
FIG. 5 illustrates a user data track spiral and a nested image data track spiral to set forth a preferred arrangement for the data tracks and image tracks of FIG. 4.

FIG. 5 shows a first preferred arrangement for the data tracks and image tracks on a selected medium (such as 100, 110 in FIGS. 1-2). In this example, the respective data tracks 116 are provided along a continuous user data spiral 120 which stores the user data and is read by a readback system (not shown) in a substantially conventional manner during a readback operation. The image tracks 118 are provided along a separate image data spiral 122 to form the watermark on the medium. All, or merely a portion of the image data spiral 122 can be utilized to form the watermark.

It will be understood that the image data spiral 122 is configured to provide the requisite pixelization to render the watermark visible and with the intended human observable characteristics. The features of the image data spiral 122 may have similar, or alternatively very different, lengths, widths, depths, etc. than the pits and lands on the user data spiral 120. In a preferred embodiment, the image data are formed using the same equipment as is used to form the data tracks, although such is not necessarily required.

Preferably, the inter-track spacing between the user data spiral 120 and the image data spiral 122 will be maintained at a substantially constant distance, and this distance is preferably set at the nominal inter-track spacing for that type of disc or other medium. In such case, the region of the disc having both spirals will generally have about 50% of the data storage capacity that a comparative portion of the disc would have if only user data tracks were utilized. Such reduction in data capacity may not present a significant problem, since the reduction only occurs in the radial band in which the watermark extends, and because the watermark preferably only affects the data capacity of a single layer of the disc.

In applications where the watermark only occupies a portion of the entire radial extent of the data storage area, the remaining portions of the data storage area will preferably not include the image data spiral 122 and the user data spiral 120 will preferably utilize a conventional inter-track spacing distance, such as represented in FIG. 3. For reference, it will be understood that FIG. 5 shows a single track of the image data spiral 122 (i.e., one full circuit around the center of the disc) and two consecutive tracks of the user data spiral 120 (i.e., two full circuits around the center of the disc).

FIG. 6 provides an alternative pattern layout in which discrete, concentric tracks are formed on the associated medium. More specifically, three concentric user data tracks are denoted at 124, 126 and 128, and two concentric image data tracks are denoted at 130, 132. As before, the inter-track spacing between user data tracks and image data tracks is preferably maintained at a nominally constant level. If the watermark occupies only a portion of the overall radius of the medium, then the user data tracks can resume with a closer track pitch as shown in FIG. 3 in the non-image areas of the medium.

While a single image track is shown between each pair of adjacent user data tracks, such is not limiting; in alternative embodiments, multiple image tracks can be inserted between adjacent data tracks, and vice versa. Moreover, one form of track can be spiral and the other can be concentric, as desired.

The respective image data tracks and user data tracks exemplified in FIGS. 5 and 6 can be formed in a variety of ways, such as set forth by FIGS. 7 and 8. FIG. 7 provides a functional block representation of a mastering system 140 in which a master disc 142 is preferably formed. A population of replicated discs are thereafter created from stampers made from the master disc.

The master disc 142 preferably comprises a layer of photoresist on a glass base that is controllably rotated by a motor 144. The photoresist is selectively exposed by an optical transducer 146, which advances radially across the disc via actuator 148.

At this point it will be noted that the use of photoresist is preferred but not required. Those skilled in the art will recognize that other master disc generation techniques have been developed in the art and can alternatively be utilized, such as non-photo-resist (NPR) or phase-transition-mastering (PTM) techniques which generally form detectable features upon recording to the master disc.

A control circuit 150, which may include a programmable processor and other hardware or firmware components, receives respective input data from source 152 and image data from source 154, and provides the requisite signal processing to provide a data stream to encoder block 156. The encoder 156 generates an extended frequency modulated (EFM) signal which modulates the write beam of the transducer 146.

When the image data and user data are arranged in respective spirals as represented in FIG. 5, in a preferred embodiment two recording passes are made on the glass master 142. That is, the entire user data spiral 116 is written during one pass, and the entire image data spiral 118 is written during another pass. When the image data and user data are arranged in concentric tracks as represented in FIG. 5, the respective tracks can be written sequentially (e.g., from ID to OD), so that, for example, a portion of the user data (e.g., the data track 128) is written, the transducer is advanced toward the OD, a portion of the image data (e.g., the image track 132) is written, and so on. Alternatively, the user data can be written in its entirety and then the image data can be inserted therebetween (or vice versa).

An alternative mastering system 160 is set forth by FIG. 8. The system 160 is similar to the system 140 in FIG. 6 and includes a second transducer 162 adjacent the first transducer 146. Preferably, the effective spacing between the transducers 146, 162 is set to correspond to the desired spacing between adjacent data and image tracks. In this way, data and image tracks can be concurrently formed on the glass master 142 in an efficient manner, irrespective of whether the tracks are written in concentric or spiral fashion.

Figure 9:
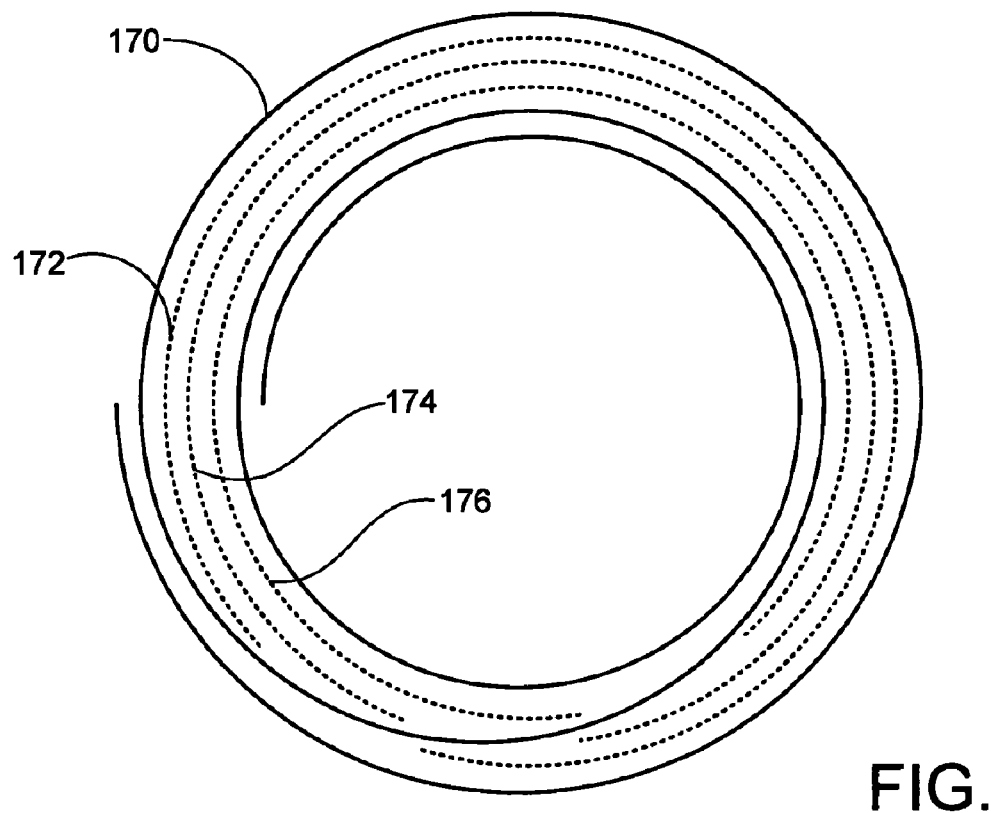
FIG. 9 provides another alternative arrangement for the data tracks and image tracks.
Figure 10:
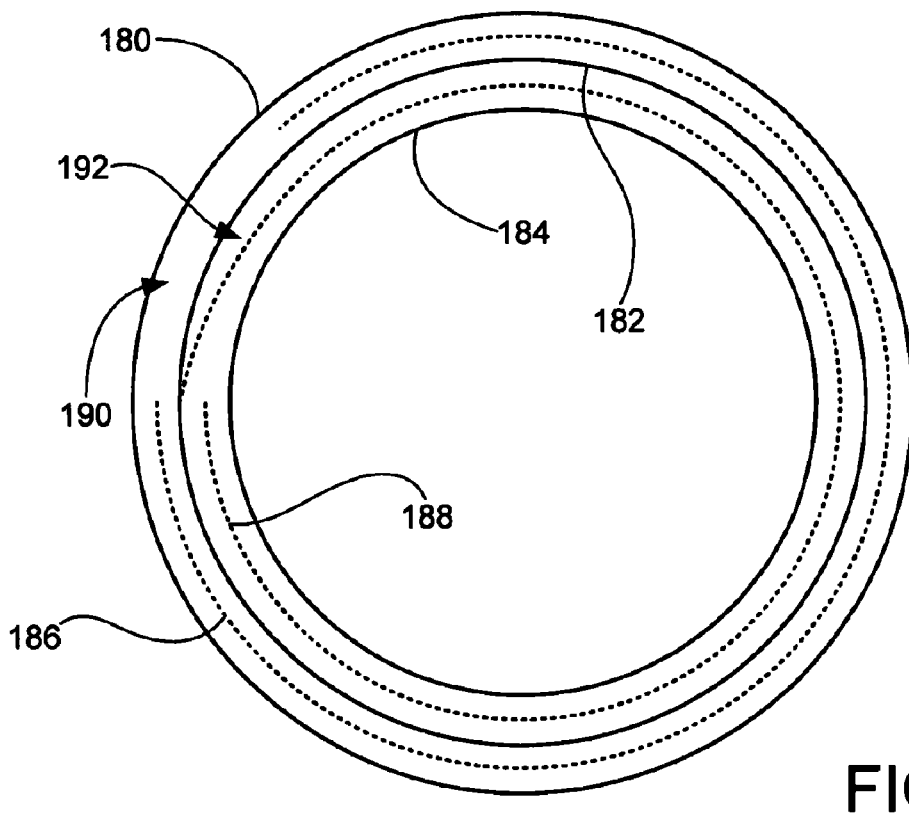
FIG. 10 shows yet another alternative arrangement for the data tracks and image tracks.

FIGS. 9 and 10 show additional preferred arrangements that can be readily generated by the systems of FIGS. 6 and 7. FIG. 9 provides a user data spiral 170 which bounds discrete, concentric image tracks 172, 174, 176. The image tracks 172, 174, 176 are shown to be preferably discontinuous in regions immediately adjacent the user data spiral 170 to enhance the ability of the readback system to follow the spiral 170. From FIG. 9 it will be appreciated that any number of different image and data track densities and spacings can be utilized as desired, so long as the readback system can readily recover the user data.

While the watermark images can be formed by modulating the respective lengths, widths and/or depths of pits and lands otherwise readable by a readback system, as mentioned above it is expressly contemplated in preferred embodiments that the image data is not used to encode user data intended to be returned to a user. That is, while the particular methodology utilized to form the pixels of the watermark image may in fact use pit and land characteristics that could result in a useful data readback signal, it is contemplated that such data will be separate from, and not form a portion of, the data content intended to be supplied to the user (e.g., video or A/V works, computer ROM programming, audio data, etc.).

It is contemplated that under certain circumstances a readback system may inadvertently lock onto the image data and initiate an undesired readback sequence therefrom. Accordingly, the image tracks/spirals are preferably configured with features that cause the readback system to desist following said image data and move to adjacent user data. FIG. 10 provides an example that utilizes concentric tracks, although it will be understood that similar features can be used with spirals.

In FIG. 10, three concentric data tracks are shown at 180, 182 and 184, and image tracks 186 and 188 are inserted therebetween. Image track 186 includes a discontinuity gap at 190 that includes no transitions or other features that can be followed by the transducer of the readback system. Should the transducer inadvertently begin transducing readback data from the image track 186, upon encountering the gap 190 the associated servo loop will cause a radial displacement of the transducer in an effort to lock onto one of the adjacent tracks 180, 182.

Similarly, image track 188 is largely concentric, but includes a spiral tail portion 192 that merges with data track 182. In this case, should the transducer inadvertently initiate track following along image track 188, the tail portion 192 will ultimately guide the transducer back onto the data track 182.

As mentioned previously, the dual user/image data arrangement as embodied herein can be provided on a prerecorded or a recordable (once or many times) disc or other medium.

One way to provide the image data to a recordable medium is to start with a master disc, write wiggle pregrooves (ATIP) for the data tracks/spiral, and then concurrently or subsequently write the final desired "pixelization" pattern along the image tracks/spiral, as discussed above.

In this case, once the replicated media are formed from this glass master (via stamper generation, etc.), the desired graphics will generally be on every single replicated, recordable disc in relation to the pixelization pattern laid down during mastering. This is particularly advantageous when the graphics are "global" in nature (e.g., the graphics identify a trade name or brand of a given supplier or source of the recordable discs, etc.).

Under this methodology, the data track/spiral areas are generally the only portions of the medium available for recording of data by the end user or the content provider. For simplicity sake, the recordable dye layer could extend all the way across the disc (and would remain transparent over the user data). In an alternative approach, the discs are processed so that the dye layer is selectively laid out to generally only lie proximate the recordable data track/spiral.

Another preferred way to provide the image data on recordable discs generally involves forming separate wiggle pregrooves both for the data track/spiral and the image track/spiral portions. Sync words or another suitable mechanism are preferably applied to the image track so that the recorder can distinguish between the image tracks and user data tracks.

In this situation, the "blank" replicated recordable media will in fact be blank initially, both with respect to recorded user data and with respect to the image. It would then be possible for either the supplier of the blank media, or a content provider who adds the content to the discs, to subsequently add the desired image. The image technology preferably implements a modulation of pit and land lengths as is known in the art, although a relatively simple graphics program can be used to translate an input image into the required exposure pattern on the image data areas.

In a related embodiment, the recordable media (e.g., a recordable DVD-R) is supplied to the end user in a blank state. Then, when data are recorded to the blank media by the end user, a simple executable routine at the end user level adds the graphics based on the content being added to the disc. One way would be to detect the content (e.g., via the Internet) being written to the disc and form an appropriate image reflecting the same (e.g., the name of an artist or game provider, a content title, etc.). Alternatively, the end user is provided with the option of selecting the graphics to be added to individually personalize the medium (e.g., "Jeff's Disc," etc.).

Another aspect of the image/data arrangements as embodied herein allows the provision of images on multiple recording layers in discs and other media that incorporate multiple recording layers. The images can be separate or "combined" to provide the final image. Also, one layer can have a "premastered" image and the other layer could have a writable image that is formed at a later time (e.g., the first image on a first layer identifies the source of the medium, the second image on a second layer identifies the title of the content, and so on).

From the foregoing discussion, and the attached materials, it can be readily seen that preferred embodiments of the present invention provide an efficient and effective methodology for providing human detectable image data (watermarks) on storage media such as optical discs. While it is contemplated in preferred embodiments to use the same recording equipment to provide both image and user data, such is not necessarily required.

Further, it is not necessarily required that the image data provided along the interspersed image tracks be expressed in the form of pits and lands, but rather can be expressed in any number of types of marks including embossment, dyes, ink jet writing, etc. to provide the image data to the image tracks. While the respective image tracks and data tracks have been preferably shown to each include a full 360 degree circuit, such is not necessarily required; for example, without limitation the track pitch between an adjacent pair of data tracks can vary along a selected angular extent of the track to accommodate an intervening image track that only extends for a portion of a complete circumference of the medium.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the appended claims.

What is claimed is:

1. An apparatus comprising a data storage medium with a user data storage area which stores user data, said storage area comprising a first track on which user data are stored and a second track adjacent the first track on which human readable information is stored to form at least a portion of a human readable watermark on said medium, wherein user data are not stored on said second track, wherein the first track forms a portion of a first spiral and the second track forms a portion of a distinct second spiral nested within the first spiral, wherein the first spiral is characterized as comprising a plurality of successively adjacent data tracks to which user data are stored, and wherein the second spiral is characterized as comprising a plurality of successively adjacent image tracks to which the human readable information is stored, wherein each selected one of the plurality of successively adjacent image tracks is disposed between an immediately adjacent pair of the successively adjacent data tracks.

2. The apparatus of claim 1, wherein the first track comprises a first concentric circle and the second track substantially comprises a second concentric circle nested within the first concentric circle.

3. The apparatus of claim 1, wherein the first track is characterized as a first data track, wherein the data storage area comprises a second data track immediately adjacent the first data track, and wherein the second track is characterized as an image track disposed between the first and second data tracks.

4. The apparatus of claim 1, wherein the second track comprises a feature that causes a readback system, upon engaging a track following operation of a transducer upon the second track, to guide the transducer to the first track.

5. The apparatus of claim 1, wherein the medium is characterized as an optical disc.

6. The apparatus of claim 1, wherein the medium is characterized as a recordable medium with respective wiggle pre-grooves to define the respective first and second tracks.

7. The apparatus of claim 6, wherein the medium is configured to have the user data written to the first track by a first party and to have the human readable information subsequently written to the second track by a second party.

8. The apparatus of claim 1, wherein the medium comprises multiple recording layers, wherein the first and second tracks are disposed on a first layer, and wherein an additional image track is disposed on a second layer so that the human readable watermark is expressed by a pattern including the second track and the additional image track.

9. The apparatus of claim 1, wherein the human readable information is non-machine readable information.

10. An apparatus comprising a data storage medium with a user data storage area which stores user data, said storage area comprising a first track on which user data are stored and a second track adjacent the first track on which human readable information is stored to form at least a portion of a human readable watermark on said medium, wherein user data are not stored on said second track, wherein the data storage area further comprises a first set of successively adjacent data tracks to which user data are stored and a second set of successively adjacent data tracks to which user data are stored, wherein the data tracks of the first set are provided with a first track pitch comprising a separation distance between respective centerlines of adjacent pairs of said data tracks, wherein the data tracks of the second set are provided with a second track pitch greater than the first track pitch, and wherein a plurality of image tracks are interspersed between adjacent pairs of the data tracks of the second set to provide the human readable watermark.

11. An apparatus comprising a mastering system configured to write data to a data storage medium to provide a user data storage area thereon which stores user data, said storage area comprising a plurality of data tracks on which user data are stored and a plurality of image tracks on which human readable information is digitally encoded to form at least a portion of a human readable watermark on said medium, wherein user data are not stored on said image tracks and each respective image track is disposed between a different pair of immediately adjacent data tracks.

12. The apparatus of claim 11, wherein the mastering system comprises a light source which selectively exposes the data storage medium to write said user data to the first track and said human readable information to the second track.

13. The apparatus of claim 11, wherein the mastering system comprises first and second light sources which concurrently expose the data storage medium so that the first light source writes said user data to the first track and said second light source writes said human readable information to the second track.

14. The apparatus of claim 11, wherein the data storage medium is characterized as a recordable medium.

15. An apparatus comprising a data storage medium with a user data storage area which stores user data, said storage area comprising a plurality of data tracks on which user data are stored and a plurality of image tracks on which human readable information is digitally encoded to form at least a portion of a human readable watermark on said medium, wherein user data are not stored on said image tracks and each respective image track is disposed between a different pair of immediately adjacent data tracks.

16. The apparatus of claim 15, wherein the plurality of data tracks form a portion of a first spiral and the plurality of image tracks form a portion of a distinct second spiral nested within the first spiral.

17. The apparatus of claim 15, wherein the plurality of data tracks are characterized as concentric circles and the plurality of image tracks are characterized as concentric circles individually nested between adjacent pairs of the data tracks.

18. The apparatus of claim 15, wherein the medium is characterized as a recordable medium with respective wiggle pre-groove spirals to define the respective plurality of data tracks and plurality of image tracks so that a user can subsequently write data to said plurality of data tracks and write a human readable image to said plurality of image tracks.

\* \* \* \* \*